United States Patent
Jung

(10) Patent No.: US 8,306,524 B2
(45) Date of Patent: Nov. 6, 2012

(54) MOBILE TERMINAL WITH CAMERA CLOCK FREQUENCY CONTROL

(75) Inventor: Hwanchul Jung, Gwangmyeong (KR)

(73) Assignee: LG Electronics Inc., Seoul (KR)

( * ) Notice: Subject to any disclaimer, the term of this patent is extended or adjusted under 35 U.S.C. 154(b) by 105 days.

(21) Appl. No.: 12/901,112

(22) Filed: Oct. 8, 2010

(65) Prior Publication Data

US 2011/0136475 A1    Jun. 9, 2011

(30) Foreign Application Priority Data

Dec. 8, 2009    (KR) ........................ 10-2009-0121346

(51) Int. Cl.
*H04M 3/00*    (2006.01)
(52) U.S. Cl. ...................... 455/420; 455/556.1; 375/345
(58) Field of Classification Search .................. 455/420, 455/556.1; 375/346
See application file for complete search history.

(56) References Cited

U.S. PATENT DOCUMENTS

2003/0198307 A1* 10/2003 Neill et al. ..................... 375/346
2005/0255881 A1* 11/2005 Yamamoto et al. ......... 455/556.1
2007/0014556 A1*  1/2007 Persson ........................... 396/57

FOREIGN PATENT DOCUMENTS

JP    2008-136200    6/2008

OTHER PUBLICATIONS

European Search Report dated Mar. 24, 2011.

* cited by examiner

*Primary Examiner* — Jinsong Hu
*Assistant Examiner* — Nathan Taylor
(74) *Attorney, Agent, or Firm* — Ked & Associates LLP

(57) ABSTRACT

A method for controlling a mobile terminal includes operating at least one clock at first and second frequencies, determining wireless sensitivities of the mobile terminal at the first and second frequencies, comparing the wireless sensitivities, and controlling a camera of the mobile terminal at one of the first or second frequencies based on said comparison of the wireless sensitivities.

14 Claims, 9 Drawing Sheets

MOBILE TERMINAL WITH CAMERA CLOCK FREQUENCY CONTROL

CROSS-REFERENCE TO RELATED APPLICATIONS

Pursuant to 35 U.S.C. §119(a), this application claims benefit of the earlier filing date and right of priority to Korean Application No. 10-2009-0121346, filed on Dec. 8, 2009, the content of which is incorporated herein by reference.

BACKGROUND

1. Field

One or more embodiments described herein relate to controlling one or more functions or devices of a mobile terminal.

2. Background

Many types of mobile terminals are equipped with cameras that capture still or moving images. Modern terminals use these cameras to support video calling functions. In order to perform these and other functions, the clock used to control the camera must operate at a relatively high frequency, so that the image data may be processed at sufficiently high speeds and pixel resolutions.

Using a clock for this purpose causes harmonic components to be generated that adversely affect the wireless communication unit of the terminal. For example, the clock may cause the wireless sensitivity of the terminal to be lowered during calling via a specific wireless channel, which corresponds to a multiplied frequency of the clock frequency.

DETAILED DESCRIPTION

Figure 1:
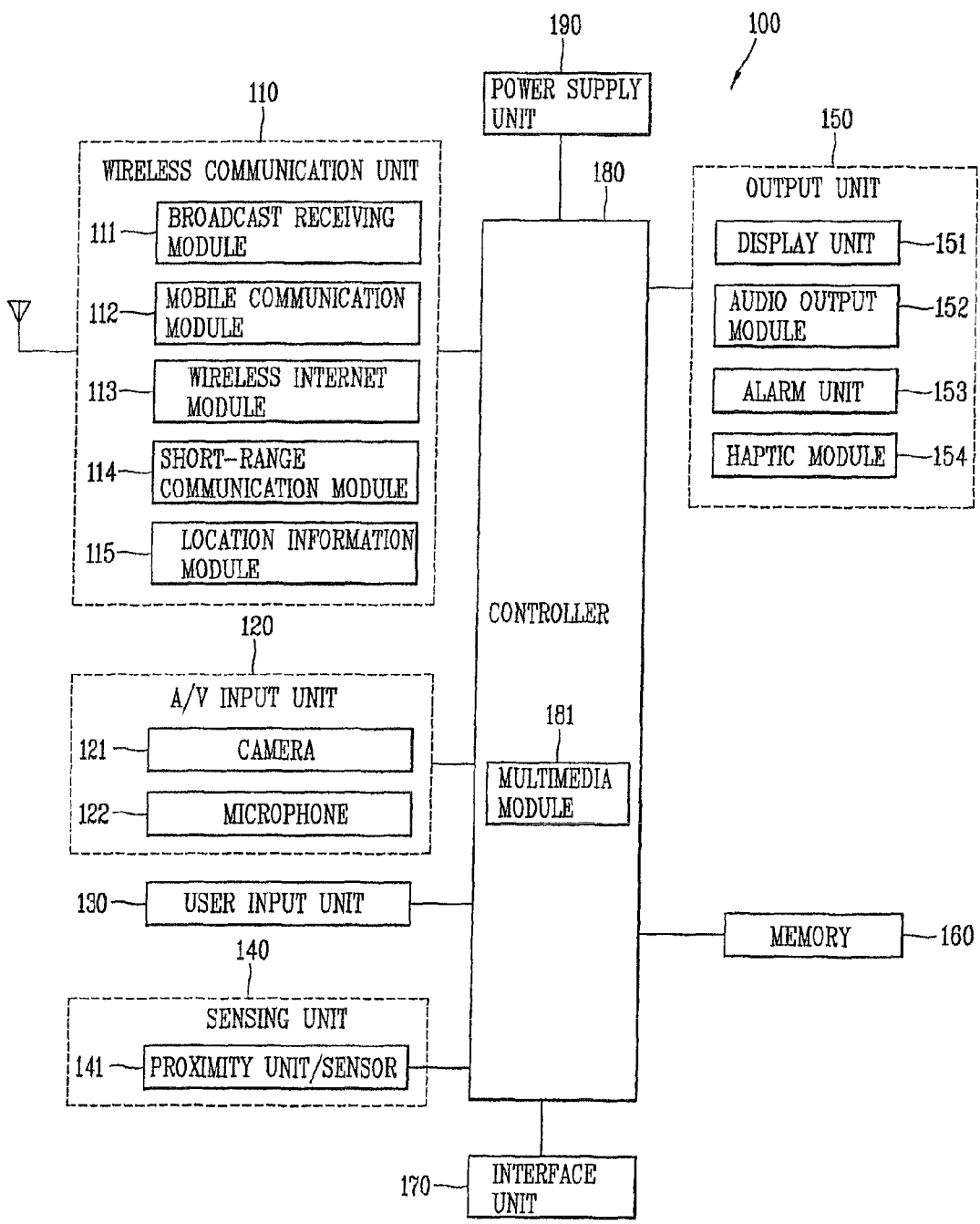
FIG. 1 is a diagram showing one embodiment of a mobile terminal.

FIG. 1 shows one embodiment of a mobile terminal 100 which includes a wireless communication unit 110, Audio/Video (A/V) input unit 120, user input unit 130, sensing unit 140, output module 150, memory 160, interface unit 170, controller 180, and power supply unit 190. A different arrangement of components may be included in other embodiments.

The wireless communication unit 110 may include one or more components which permit communications to take place between the mobile terminal 100 and a wireless communication system, or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 or the like.

The broadcast receiving module 111 receives a broadcast signal and/or broadcast associated information from an external broadcast managing entity via a broadcast channel. The broadcast channel may include a satellite channel and a terrestrial channel. The broadcast managing entity may include a server which generates and transmits a broadcast signal and/or broadcast associated information and/or a server which receives a pre-generated broadcast signal and/or broadcast associated information and sends them to the mobile terminal. The broadcast signal may be implemented as a TV broadcast signal, a radio broadcast signal, or a data broadcast signal, as well as other types of signals. The broadcast signal may also include a data broadcast signal combined with a TV or radio broadcast signal.

The broadcast associated information may indicate information relating to broadcast channels, broadcast programs or broadcast service providers. Further, the broadcast associated information may be provided via a mobile communication network and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems, including but not limited to Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), and Integrated Services Digital Broadcast-Terrestrial (ISDB-T). The broadcast receiving module 111 may be configured to be suitable for any broadcast system that transmits broadcast signals as well as the digital broadcasting systems.

Broadcast signals and/or broadcast associated information received via the broadcast receiving module 111 may be stored in a memory 160 or other device.

The mobile communication module 112 transmits/receives wireless signals to/from at least one of network entities (e.g., a base station, an external terminal, a server, or other component) on a mobile communication network. The wireless signals may include one or more of an audio call signal, video call signal, or various formats of data according to transmission/reception of text/multimedia messages.

The wireless internet module 113 supports wireless Internet access for the mobile terminal 100 and may be internally or externally coupled to the mobile terminal 100. Examples of wireless Internet access may include Wireless LAN (WLAN) (Wi-Fi), Wireless Broadband (Wibro), World Interoperability for Microwave Access (Wimax), and High Speed Downlink Packet Access (HSDPA).

The short-range communication module 114 denotes a module for short-range communications. Examples of suitable technologies for implementing this module include BLUETOOTH, Radio Frequency IDentification (RFID), Infrared Data Association (IrDA), Ultra-WideBand (UWB), and ZigBee.

The position information module 115 denotes a module for detecting or calculating a position of a mobile terminal. An example of the position information module 115 may include a Global Position System (GPS) module. The GPS module can measure accurate time and distance respectively from more than three satellites, so as to accurately calculate a current position of the mobile terminal based on such three different distances according to a triangulation scheme. A scheme may be used to obtain time information and distance information from three satellites and correct error by one satellite. Also, the GPS module may continuously calculate a current position in real time so as to obtain speed information.

The A/V input unit 120 is configured to provide audio and/or video signals input to the mobile terminal and may include a camera 121 and a microphone 122. The camera 121 receives and processes image frames of still pictures or video obtained by image sensors in a video (telephony) call mode or a capturing mode. The processed image frames may be displayed on a display 151.

The image frames processed by the camera 121 may be stored in the memory 160 or transmitted to an exterior device via the wireless communication unit 110. In an alternative embodiment, two or more cameras 121 may be provided according to the use environment of the mobile terminal.

The microphone 122 may receive an external audio signal while the mobile terminal is in a particular mode such as, for example, phone call mode, recording mode, or voice recognition mode to name a few. The audio signal may be processed into digital data, and then converted for output into a format transmittable to a mobile communication base station via, for example, the mobile communication module 112 in phone call mode. The microphone 122 may include assorted noise removing algorithms to remove noise generated in the course of receiving the external audio signal.

The user input unit 130 may generate input data input by a user to control the operation of the mobile terminal. The user input unit 130 may include, for example, one or more of a keypad, dome switch, touchpad (static pressure or capacitance), jog wheel, and jog switch. When the touch pad has a layered structure with a display 151 to be later explained, this may be referred to as a 'touch screen'.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the orientation of the mobile terminal 100, and/or acceleration/deceleration of the mobile terminal 100, so as to generate a sensing signal for controlling the operation of the mobile terminal 100.

For example, for a slide-type mobile terminal, the sensing unit 140 may sense whether a sliding portion of the mobile terminal is open or closed.

Other examples include sensing functions such as the sensing unit 140 sensing the presence or absence of power provided by power supply 190, and/or the presence or absence of a coupling or other connection between the interface unit 170 and an external device. Moreover, the sensing unit 140 may include a proximity sensor 141 which will be later explained in relation to a touch screen.

The interface unit 170 may be implemented to interface the mobile terminal with external devices. The interface unit 170 may allow a data reception from an external device, a power delivery to each component in the mobile terminal 100, or a data transmission from the mobile terminal to an external device. The interface unit 170 may include, for example, wired/wireless headset ports, external charger ports, wired/wireless data ports, memory card ports, ports for coupling devices having an identification module, audio Input/Output (I/O) ports, video I/O ports, or earphone ports.

The identification module may be configured as a chip for storing various information required to authenticate an authority to use the mobile terminal 100 such as, for example, a User Identity Module (UIM) or a Subscriber Identity Module (SIM). Also, the device having the identification module (hereinafter, referred to as 'identification device') may be implemented in a type of smart card. Hence, the identification device can be coupled to the mobile terminal 100 via a port.

Also, the interface unit 170 may serve as a path to supply power from an external cradle to the mobile terminal 100 when the mobile terminal is connected to the external cradle, or as a path for transferring command signals input from the cradle by a user to the mobile terminal 100. Such command signals or power input from the cradle may operate as signals for recognizing that the mobile terminal 100 has accurately been mounted to the cradle.

The output unit 150 is configured to output an audio signal, a video signal or an alarm signal. The output unit 150 may include a display 151, an audio output module 152, and/or an alarm 153.

The display 151 may output information processed in the mobile terminal 100. For example, when the mobile terminal is operating in a phone call mode, the display 151 may provide a User Interface (UI) or a Graphic User Interface (GUI) which includes information associated with the call. As another example, if the mobile terminal is in a video call mode or a capturing mode, the display 151 may additionally or alternatively display images captured and/or received, UI, or GUI.

As previously mentioned, in a case that the display 151 and the touch pad have a layered structure with each other to implement a touch screen, the display 151 may be implemented using, for example, a Liquid Crystal Display (LCD), a Thin Film Transistor-Liquid Crystal Display (TFT-LCD), an Organic Light-Emitting Diode (OLED), or a flexible display, a three-dimensional (3D) display.

Also, the display may be configured to be transparent. One examples of a transparent display includes a Transparent Organic Light Emitting Diode (TOLED).

The display 151 may be implemented as two or more displays according to a configured aspect of the mobile terminal 100. For instance, both an external display (not shown) and an internal display (not shown) may be provided at the mobile terminal 100. The touch screen may be configured to sense not only a touched position and a touched area, but also a touch pressure.

A proximity sensor 141 may be arranged at an inner region of the touch screen or near the touch screen, and may serve to sense the presence or absence of an object approaching a surface to be sensed or an object disposed near a surface to be sensed. This may be accomplished, for example, by sensing an electromagnetic field or infrared rays without mechanical contact. The proximity sensor 141 may be expected to have a longer lifespan and a more enhanced utility than a contact sensor.

The proximity sensor 141 may be a transmissive-type photoelectric sensor, a direct reflective type photoelectric sensor, a mirror reflective type photoelectric sensor, a high-frequency oscillation proximity sensor, a capacitance type proximity sensor, a magnetic type proximity sensor, or an infrared rays proximity sensor.

A high-frequency oscillation-type proximity sensor may operate as follows. When an object to be detected comes close to a sensor detection surface when an oscillatory circuit is operating at high frequency, an oscillatory amplitude of the oscillatory circuit is attenuated or stopped. Such change is converted into an electrical signal to detect an existence of the object to be detected. Thus, even if any material other than metal is positioned between the high-frequency oscillation-type proximity touch and the object to be detected, a proximity switch may detect the object to be detected without any interruption of the material.

When the touch screen is implemented as a capacitance type, proximity of a pointer to the touch screen is sensed by changes of an electromagnetic field. In this case, the touch screen (touch sensor) may be categorized into a proximity sensor.

Accordingly, if the pointer is in proximity to the touch screen without contacting the touch screen, the position of the pointer and a distance between the pointer and the touch screen may be detected.

Hereinafter, for the sake of explanation, a status where the pointer is positioned proximate the touch screen without contact will be referred to as 'proximity touch', and a status where the pointer substantially comes in contact with the touch screen will be referred to as 'contact touch.' For a position corresponding to a proximity touch of the pointer on the touch screen, such position may be considered to correspond to a position where the pointer faces at least substantially perpendicular (or at another predetermined angle) to the touch screen upon the proximity touch of the pointer.

The proximity sensor 141 senses proximity touch and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160 in a call-receiving mode, a call-placing mode, a recording mode, a voice recognition mode, and/or a broadcast reception mode. The audio output module 152 may output audio signals relating to functions performed in the mobile terminal 100, e.g., a sound providing notification that a call and/or message has been received. The audio output module 152 may include a receiver, a speaker, a buzzer, or other types of device capable of alerting a user.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. For instance, the alarm 153 may be configured to vibrate responsive to the mobile terminal receiving a call or message.

As another example, when a key signal has been inputted, the alarm 153 may output vibration as a feedback of the key signal input. Through this vibration output, a user may recognize the occurrence of an event. Here, a signal indicating the occurrence of an event may be outputted through the display 151 or the audio output module 152.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, or optical disk. Also, the mobile terminal 100 may operate a web storage which performs the storage function of the memory 160 on the Internet.

The controller 180 typically controls the overall operations of the mobile terminal 100. For example, the controller 180 may perform control and processing functions associated with telephony calls, data communications, and/or video calls. Also, the controller 180 may include a multimedia module 181 which provides multimedia playback, and the multimedia module 181 may be configured as part of the controller 180 or as a separate component. The controller 180 can perform a pattern recognition processing so as to recognize writing or drawing input on the touch screen as text or image.

The power supply unit 190 provides power required by various components under control of the controller 180. The power may be internal power, external power, or a combination thereof.

Various embodiments described herein may be implemented in a computer-readable medium using, for example, software, hardware, or a combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, software code may be stored in the memory 160 and executed by the controller 180.

Figure 2:
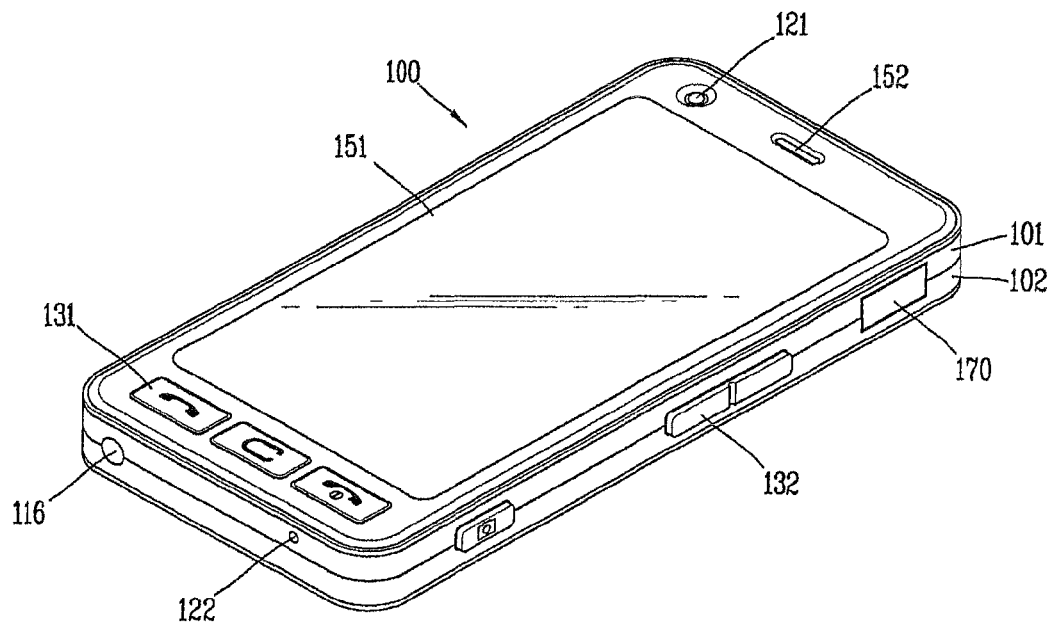
FIG. 2 is a diagram showing another view of the mobile terminal.
Figure 3:
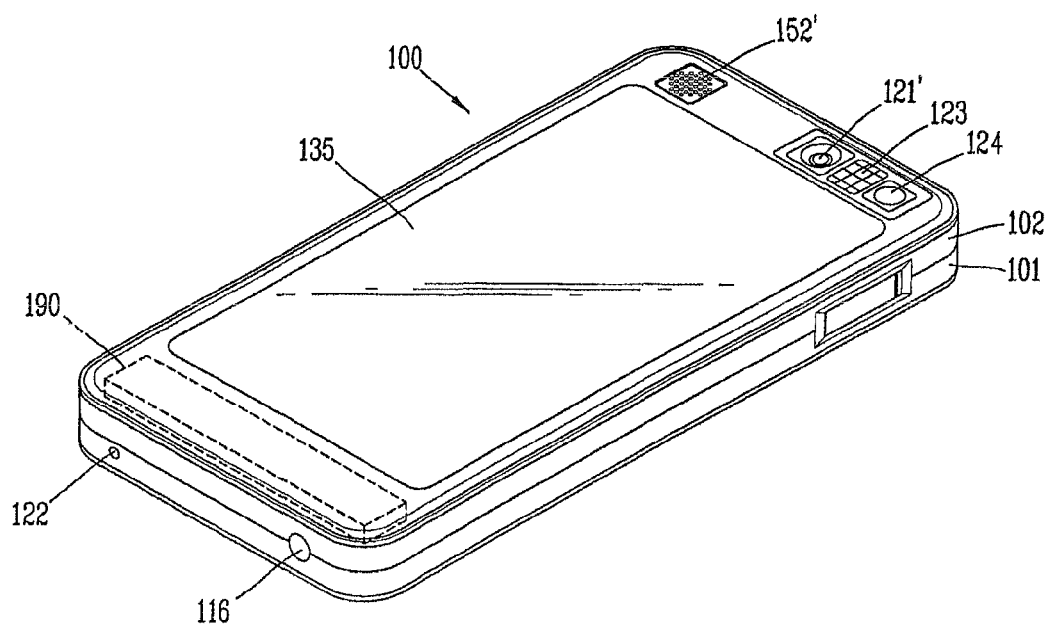
FIG. 3 is a diagram showing another view of the mobile terminal.

FIGS. 2 and 3 show one embodiment of a mobile terminal that may correspond to FIG. 1. This terminal is illustratively shown as a slider-type terminal, but may be, for example, a folder-type, bar-type, or swing-type in other embodiments.

FIG. 2 shows a front view of the mobile terminal which includes a first body 200 and a second body 205 configured to slidably cooperate with the first body 200 in at least one direction. (For a folder-type mobile terminal, the mobile terminal 100 may include a first body and a second body 205 configured to have at least one side folded or unfolded with respect to the first body 200.)

The first body 200 is positioned over the second body 205 in a manner that the second body 205 is obscured by the first body 200. This state can be referred to as a closed configuration (position). A state where the first body 200 exposes at least part of the second body 205 can be referred to as an open configuration (position).

For a folder-type mobile terminal, a first body and a second body may be included wherein the second body has one side folded or unfolded with respect to the first body. Here, a folded state of the second body can be referred to as the closed configuration and an unfolded state may be referred to as the open configuration.

For a swing-type mobile terminal, a first body and a second body may be provided wherein the second body is capable of being swung with respect to the first body. A state where the first body overlaps the second body may be referred to as a closed configuration, and a state where the second body is swung to make the first body partially exposed may be referred to as an open configuration.

The mobile terminal may be operable in standby (idle) mode when in the closed configuration, but this mode can be released by the user's manipulation. Also, the mobile terminal may typically be operable in an active (phone call) mode in the open configuration. Here, this mode may be changed into the idle mode according to the user's manipulation or after a certain time elapses.

A case forming the appearance of the first body 200 (casing, housing cover, etc.) is formed by a first front case 220 and a first rear case 225. Each kind of electronic components may be mounted in a space formed by the first front case 220 and first rear case 225. If desired, one or more intermediate cases may be provided between the first front case 220 and the first rear case 225. The cases may be formed by injection-molding resin material or may be formed using metallic material such as stainless steel (STS) and titanium (Ti).

The display 151, audio output module 152, camera 121 or first manipulation unit 210 may be disposed at the first front case 220 of the first body 200.

The audio output unit 152 may be implemented as a speaker.

The camera 121 may be configured to capture a user's still images or moving images.

Like first body 200, a case of second body 205 may be formed by a second front case 230 and a second rear case 235.

A second manipulation unit 215 may be disposed on a front surface of the second front case 230. A third manipulation unit 245, microphone 122, and interface 170 may be disposed on at least one of the second front case 230 or second rear case 235.

The first to third manipulation units 210, 215 and 245 may be referred to as a manipulation unit 130 and may include any type that can be manipulated, for example, in a tactile manner by a user.

The manipulation unit may be implemented as dome switches or a touch pad for receiving commands or information by a user's push or touch operation. Alternatively, the manipulation unit may be implemented as a jog wheel or a joystick.

In the aspect of functions, the first manipulation unit 210 may be used to input commands such as START, END, and SCROLL, and the second manipulation unit 215 may serve to input numbers, characters, symbols, etc. The first manipulation unit 210 may include soft keys interworked with icons displayed on the display 151, and navigation keys for direction indication and 'OK' input (four directional keys and one central key). The third manipulation unit 245 may serve as hot keys for activating specific functions of the mobile terminal.

The microphone 122 may be implemented to receive a user's voice or another sounds.

The interface 170 may serve as a passage through which the mobile terminal 100 exchanges data with an external device.

The power supply unit 190 for supplying power to the mobile terminal 100 is mounted at the second rear case 235.

The power supply unit 190 may be a rechargeable battery, for example, to be detachably mounted to the mobile terminal 100 for charging.

FIG. 3 shows a rear surface of the mobile terminal of FIG. 2. The rear surface may include a camera 121 which may be additionally mounted to a rear surface of the second rear case 235 of the second body 205. The camera 121 of the second body 205 faces a direction which is opposite to a direction faced by the camera 121 of the first body 200, and may have pixels different from those of the camera 121 of first body 200.

For example, camera 121 of the first body 200 may operate with a relatively lower number of pixels (lower resolution). Thus, camera 121 of the first body 200 may be useful when a user can capture his face and send it to a calling party in a video call mode or the like. On the other hand, the camera 121 of the second body 205 may operate with a relatively higher number of pixels (higher resolution) such that it can be useful for a user to obtain higher quality pictures for later use.

A flash 250 and a mirror 255 may be additionally disposed adjacently to the camera 121 of the second body 205. When capturing an object by using the camera 121 of the second body 205, flash 250 provides light to the object. The mirror 255 can cooperate with camera 121 of second body 205 to allow a user to photograph himself or herself in a self-portrait mode.

The audio output unit 152 may be additionally disposed at the second rear case 235. The audio output unit 152 may implement a stereo function together with the audio output unit 152 of the first body 200, and may be used for calling in a speaker phone mode.

A broadcast signal receiving antenna 260 as well as an antenna for calling may be disposed at one side of the second rear case 235. The broadcast signal receiving antenna 260 may be configured to retract into the second body 205.

One portion of a slide module 265 that slidably couples the first body 200 and the second body 205 to each other is disposed at the first rear case 225 of the first body 200.

Another portion of the slide module 265 is disposed at the second front case 230 of the second body 205, thereby not being exposed out as shown in the drawings. The second camera 121 may be disposed at second body 205. However, in other embodiments, the position of second camera 121 may be at different locations.

For instance, at least one of the components 260, 121, 250 and 152 originally disposed at the second rear case 235 may be mounted to the first rear case 225 of the first body 200. In this case, the components disposed at the first rear case 225 may be protected by the second body 205 in the closed configuration.

Even if the camera 121 of the second body 205 is not provided, the camera 121 of the first body 200 configured to be rotatable may capture an image even in a capturing direction by the camera 121 of the second body 205. In addition, the mobile terminal 100 of FIGS. 1 to 3 may be configured to operate within a communication system which transmits data via frames or packets, including both wireless and wireline communication systems, and satellite-based communication systems.

Figure 4:
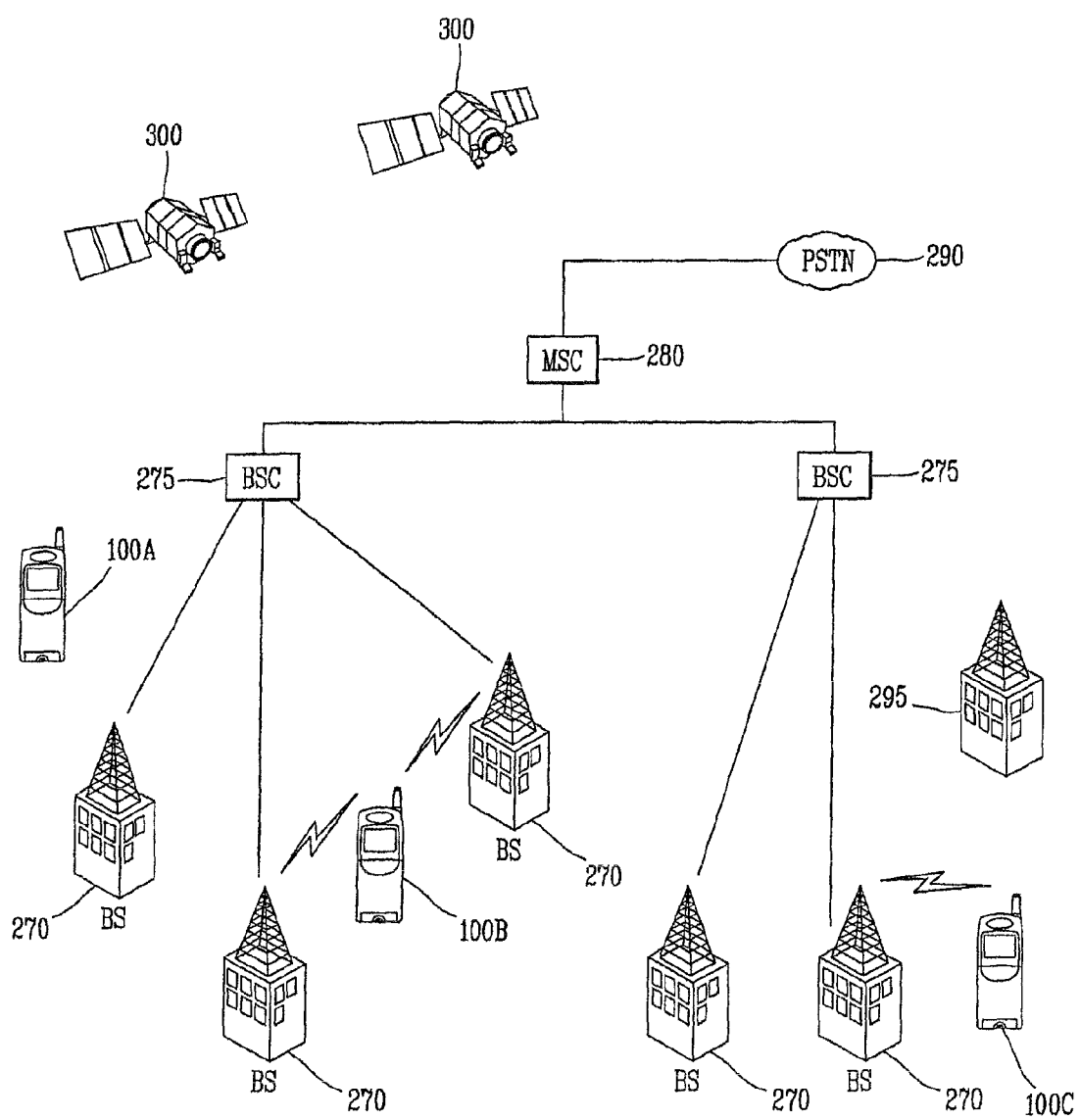
FIG. 4 is a diagram showing one type of a wireless communication system that can be used with the mobile terminal.

FIG. 4 shows an example of a communication system where the mobile terminal can be operated. Such communication systems may utilize different air interfaces and/or physical layers. Examples of such air interfaces utilized by the communication systems include frequency division multiple access (FDMA), time division multiple access (TDMA), code division multiple access (CDMA), universal mobile telecommunications system (UMTS), long term evolution (LTE) of the UMTS, and global system for mobile communications (GSM). By way of a non-limiting example only, further description will relate to a CDMA communication system, but such teachings apply equally to other system types.

As shown in FIG. 4, a CDMA wireless communication system may include a plurality of mobile terminals 100, a plurality of base stations (BSs) 270, a plurality of base station controllers (BSCs) 275, and a mobile switching center (MSC) 280. The MSC 280 is configured to interface with a public switch telephone network (PSTN) 290, and the MSC 280 is also configured to interface with the BSCs 275.

Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. The system may include more than two BSCs 275 if desired.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270. The base stations 270 may also be denoted as "cell sites." Alternatively, individual sectors of a given base station 270 may be referred to as cell sites.

As shown in FIG. 4, a broadcasting transmitter (BT) 295 transmits broadcasting signals to the mobile terminals 100 operating within the system. In addition, the broadcast receiving module 111 of FIG. 1 is provided in the mobile terminal 100 so as to receive broadcast signals transmitted by the BT 295.

Furthermore, FIG. 4 illustrates several global positioning system (GPS) satellites 300. Such satellites facilitate locating the position of some or all of the mobile terminals 100. In FIG. 4, two satellites are shown, but positioning information may be obtained with greater or fewer satellites.

In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various mobile terminals 100. The mobile terminals 100 engage in calls, messaging, and other communications.

In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

Figure 5:
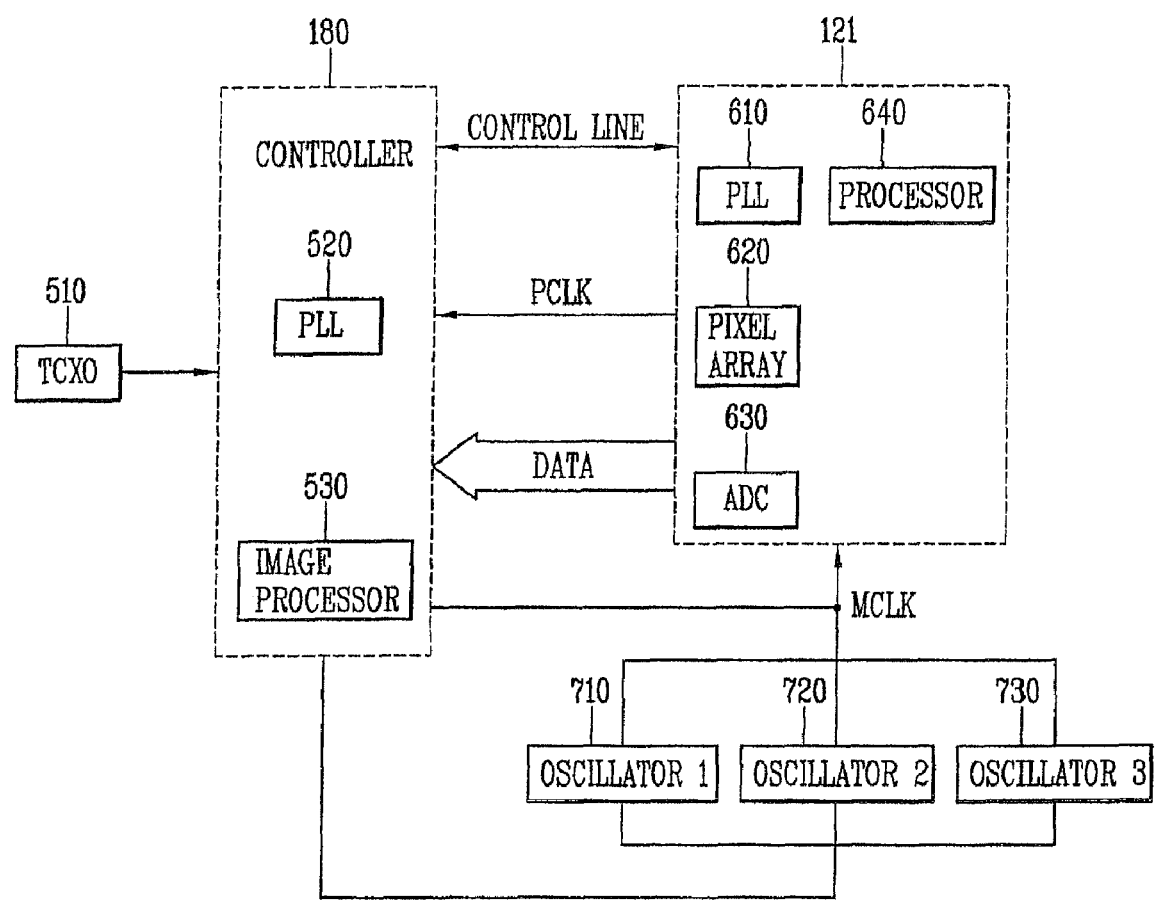
FIG. 5 is a diagram showing one possible circuit configuration that can be used with the mobile terminal.

FIG. 5 shows one embodiment of a circuit configuration of mobile 100. In this embodiment, camera 121 includes a shutter, a lens portion, a diaphragm (iris), a charge-coupled device (CCD) or a complementary metal-oxide semiconductor (CMOS) and an analog-to-digital converter (ADC). The shutter controls the amount of external light exposure together with the diaphragm. The lens portion processes an image by receiving light from an external optical source. The diaphragm controls the amount of incident light according to its open or closed degree. The open or closed degree of the diaphragm is controlled by the controller 180.

A pixel array of the CCD (or CMOS) converts light reflected from an object to be photographed into an electric signal. The ADC converts an analog image signal outputted from the CCD into a digital signal. Image data output from the pixel array undergoes a predetermined processing such as gamma compensation by an inner processor 640 of the camera 121, and then is output to the controller 180 which processes data relating to the camera 121 and is implemented as a baseband chip, a sub baseband, a digital signal processor (DSP), etc. or an external processor. The external processor may be integrally formed with the controller 180, or may be separately formed from the controller 180.

Hereinafter, the external processor may be referred to as one that is integrally formed with the controller 180. The controller 180 processes input image data as a frame unit and performs various functions including, for example, compression and format conversion. Then, the controller 180 stores the inputted image data in the memory 160 or transmits the image data to another mobile terminal through the wireless communication unit 110 thus to perform an image call function.

In order to operate the camera 121, a main clock (MCLK) of a predetermined frequency is required. The main clock may be inputted to the camera 121 from the controller 180, or may be inputted from additional oscillators 710, 720 and 730 for the camera 121.

The camera 121 outputs a horizontal synchronization signal, a vertical synchronization signal, a pixel qualification clock (PCLK), and/or other signals, together with image data so that the controller 180 can be synchronized with stream of pixel image data. The controller 180 performs a sampling process with respect to pixel data according to the pixel qualification clock. The camera 121 may output a pixel qualification clock by multiplying and/or dividing a main clock into a predetermined ratio through a phase locked loop (PLL) 610, a divider, etc.

In the present embodiment, frequencies of a main clock input to the camera 121 and a pixel qualification clock output from the camera 121 are changed under control of the controller 180. The PLL 520 receives a reference clock from a temperature compensated crystal (x-tal) oscillator (TXCO) (510) and generates a clock signal of a predetermined frequency by a voltage-controlled oscillator (VCO) according to a clock control signal. Then, the PLL 520 inputs the generates clock signal to the camera 121. The PLL 520 may be integrally formed with the controller 180 or separately formed from the controller 180, thereby outputting a main clock to the camera 121.

Alternatively, the PLL 610 may be formed in the camera 121, thereby generating a main clock or a pixel qualification clock of a desired frequency with respect to a reference clock input to the camera 121. For instance, the PLL 610 may control a frequency of an output clock by changing a multiplication ratio and/or a division ratio with respect to a reference clock. The main clock may be inputted from one oscillator selected, under control of the controller 180, from the plurality of oscillators 710, 720 and 730 which provide clock signals of different fixed frequencies.

A main clock or a pixel qualification clock required to operate the camera 121 is input from the PLL 520 for generating a variable frequency clock, or two or more oscillators 710, 720 and 730 for generating clocks of different frequencies, or the PLL and one or more oscillators 710, 720 and 730. The controller 180 controls the PLL so as to output a clock of a desired frequency or operates one of the oscillators 710, 720 and 730 for generating a clock of a desired frequency so that the clock of the desired frequency can be input into the camera 121.

Hereinafter, a process for selecting a camera clock of a frequency which does not lower wireless sensitivity of the mobile terminal, and applying the camera clock to the camera will be explained in more detail.

Figure 6:
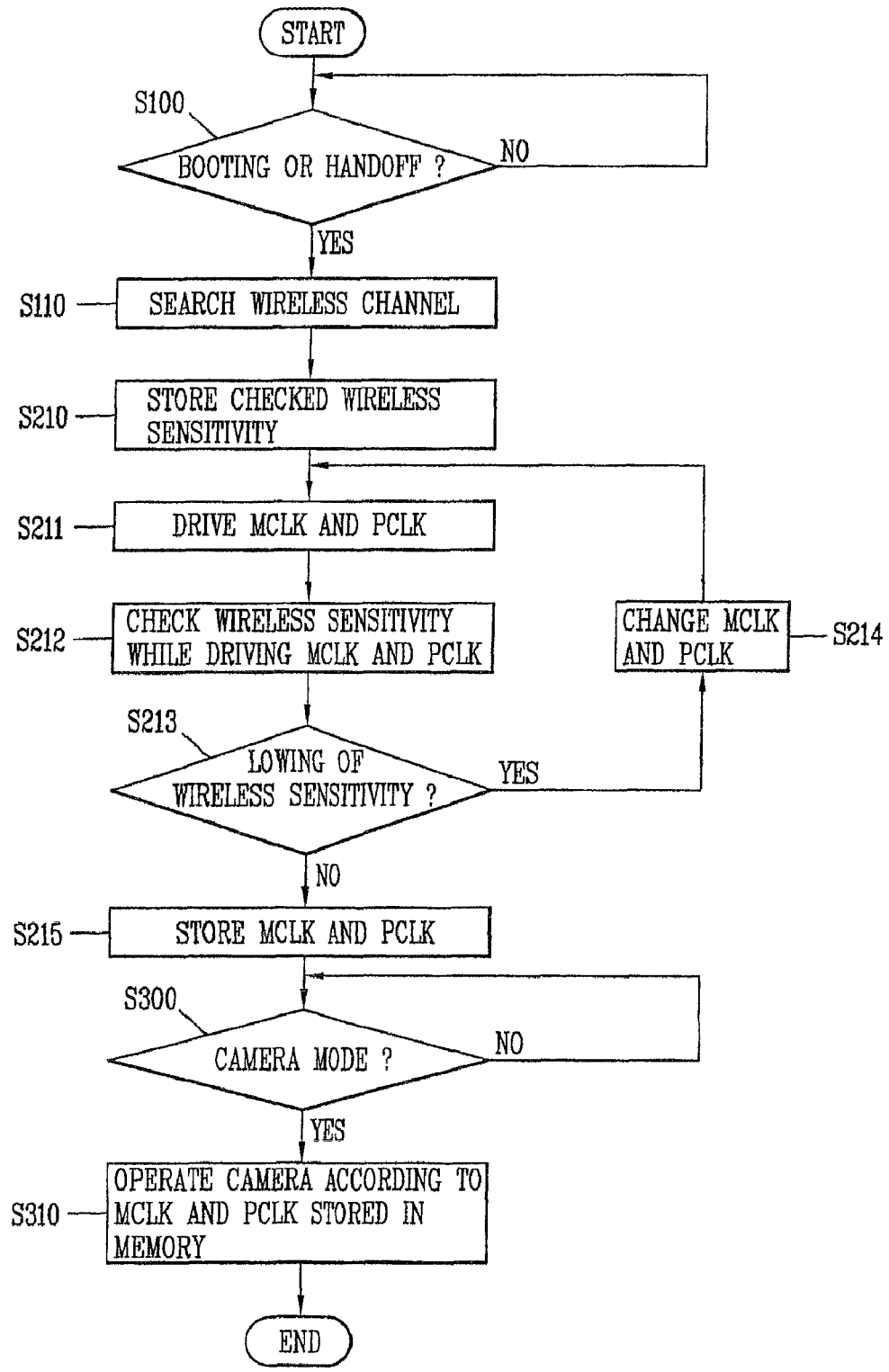
FIG. 6 is a flowchart showing operations included in another embodiment of a method for checking a camera clock frequency.

FIG. 6 shows steps included in one embodiment of a method for controlling a camera clock before the mobile terminal enters a camera mode. When a user boots the mobile terminal 100, or when the mobile terminal 100 is moved to another wireless communication section from a specific wireless communication section (S100), the controller 180 searches for a wireless channel to be connected (S110).

Once a new wireless channel using a frequency different from a previous frequency of a wireless channel has been searched, the controller 180 checks wireless sensitivity with respect to the searched wireless channel in a state that a camera clock is not driven, and stores the checked wireless sensitivity in the memory 160 (S210).

Next, the controller 180 drives a camera clock of a predetermined frequency to test whether wireless sensitivity has been lowered or not without entering a camera mode. That is, the controller 180 drives a main clock and/or a pixel qualification clock in a standby state where there is no input with respect to video call, etc. from a user (S211).

The controller 180 checks wireless sensitivity with respect to the searched channel in a state that the main clock and/or the pixel qualification clock are driven (S212). Then, the controller compares the checked wireless sensitivity with previous wireless sensitivity obtained before driving the clock, thereby determining whether the wireless sensitivity has been lowered (S213).

If there is a difference more than a predetermined value between the wireless sensitivity after driving the clock and the wireless sensitivity before driving the clock, the controller 180 changes a frequency of the driven clock (S214) and repeats the aforementioned operations (S211~S213). The clock frequency change may be performed, for example, by controlling the circuit of the PLL 610 or by changing the current oscillator into an oscillator which generates a clock of a different frequency.

When a difference between the wireless sensitivity after driving the clock and the wireless sensitivity before driving the clock is less than a predetermined value (including a case that a changed clock of a frequency due to lowering of wireless sensitivity is driven), i.e., when it is determined that wireless sensitivity has not been lowered, the controller 180 stores information on a finally driven clock of a frequency in the memory 160 (S215). For instance, the information on the clock may be stored as a predetermined value in a specific register which controls the PLL 610, the oscillators 710, 720 and 730, and/or the camera 121.

By sequentially driving a plurality of selectable frequency clocks according to a predetermined order, whether wireless sensitivity has been lowered or not may be checked. For instance, a clock frequency which has been selected most recently may be checked first. If lowering of wireless sensitivity has been detected, the remaining selectable clock frequencies may be tested according to a preset order until a clock frequency which does not lower wireless sensitivity is found. Referring to FIG. 5, oscillators 710, 720 and 730 may serve as clocks which provide different selectable fixed frequencies. These selectable clock frequencies may be set so that multiplied frequencies thereof do not overlap each other.

Then, if there is an input from a user relating to operation of camera 121 such as video calling before a wireless channel is changed (S330), the controller 180 reads clock information stored in the memory 160. And then, the controller 180 controls the PLL 520, oscillators 710, 720 and 730, and camera 121 based on the read clock information, so that the PLL 520 or the oscillators 710, 720 and 730 can generate a clock of a selected frequency, so that the camera 121 can be operated according to a main clock and a pixel qualification clock of the selected frequency (S310).

The processes of checking a camera clock (S210~S215) can be performed in advance when a user requests for entering a camera mode, or when a wireless channel is searched regardless of a request for entering a camera mode.

A method for selecting a camera clock of a frequency which does not lower wireless sensitivity may be applied to a main clock and a pixel qualification clock simultaneously or individually.

For instance, when a ratio between frequencies of a main clock and a pixel qualification clock is fixed, the main clock and pixel qualification clock may be simultaneously driven according to the fixed ratio. If lowering of wireless sensitivity has been detected, the main clock and pixel qualification clock are changed and checked again.

When the frequencies of the main clock and pixel qualification clock are independently selected, the frequency of the main clock which does not lower wireless sensitivity may be firstly selected and then the frequency of the pixel qualification clock may be selected. Since the camera 121 may not output the pixel qualification clock, a process of selecting the pixel qualification clock may be omitted. This may be applied to all the preferred embodiments which will be later explained.

If the mobile terminal has two cameras, a camera clock of a frequency applied to each camera 121 may be selected in the aforementioned manner. Clocks of different frequencies may be applied to the respective cameras 121 due to a difference between pixels of the respective cameras 121. This may be applied to all the preferred embodiments which will be later explained.

Figure 7:
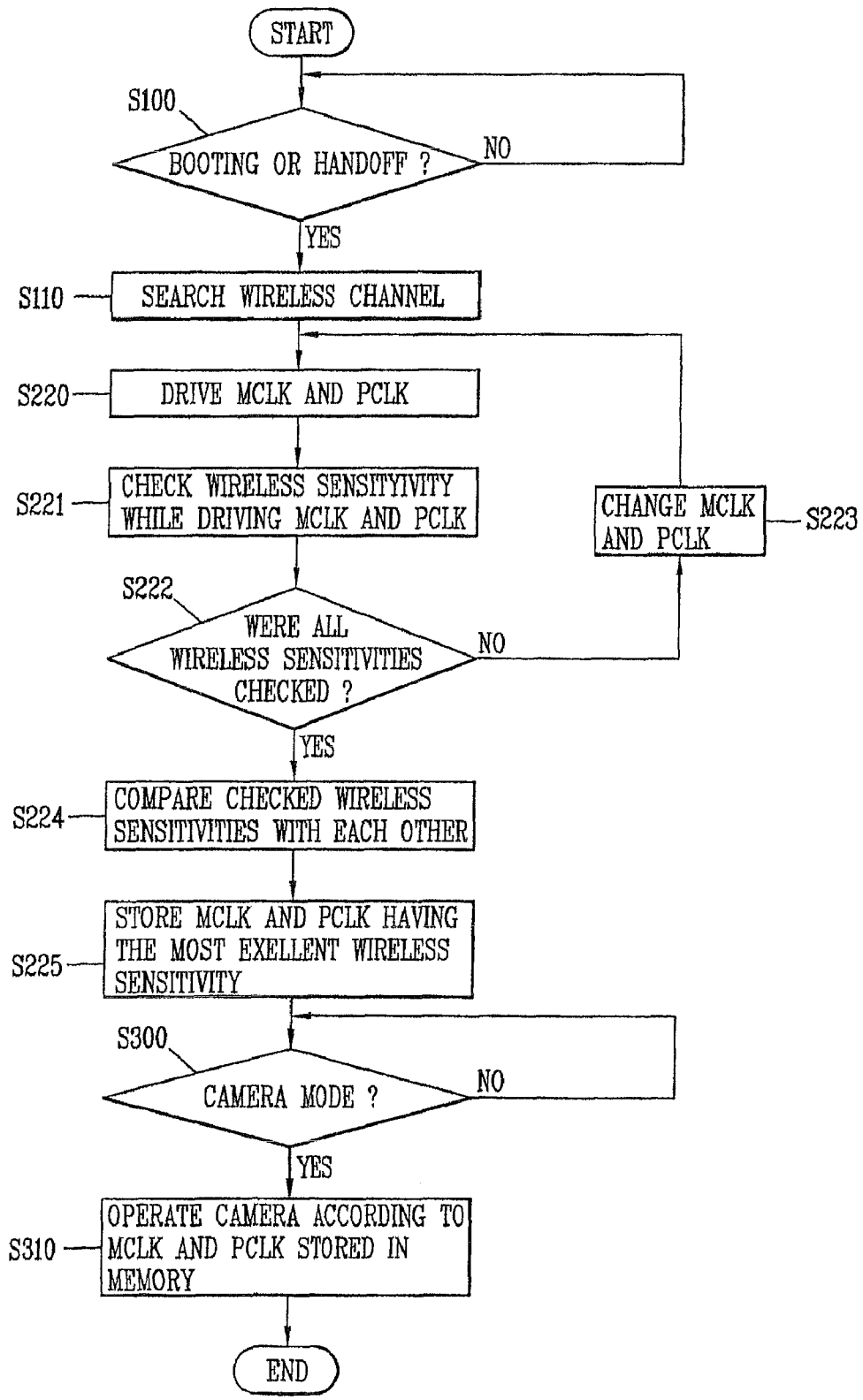
FIG. 7 is a flowchart showing operations included in another embodiment of a method for checking a camera clock frequency.

FIG. 7 shows operations included in one embodiment of a method for selecting a camera clock of a frequency which does not lower wireless sensitivity. When a user boots the mobile terminal 100 or when the mobile terminal 100 is moved to other wireless communication section from a specific wireless communication section, the controller 180 searches for a wireless channel to be connected (S100~S110).

Once a new wireless channel has been searched, the controller 180 checks wireless sensitivity in a state that each clock has been driven with respect to all or some of camera clocks of frequencies that can be applied to the camera 121, and then stores the checked wireless sensitivity in the memory 160 (S220~S223).

The controller 180 compares wireless sensitivities checked while sequentially driving the respective clocks with each other (S224), and selects and stores a camera clock of a frequency indicating the best wireless sensitivity (S225). If the wireless sensitivities checked with respect to the plurality of clocks are similar to each other (i.e., when a difference between the checked wireless sensitivities is less than a predetermined value), two or more camera clocks of different frequencies may be selected.

Alternatively, a camera clock may be selected of a frequency having a wireless sensitivity that is more than a predetermined value, or a camera clock of a frequency having a wireless sensitivity difference less than a predetermined value, the difference between wireless sensitivity before driving the clock and wireless sensitivity after driving the clock. In this case, two or more frequencies may be selected.

Then, if there is an input from a user relating to operation of camera 121 such as video calling before a wireless channel is changed (S300), the controller 180 reads clock information stored in the memory 160. And then, the controller 180 controls the PLL 520, oscillators 710, 720 and 730, and camera 121 based on the read clock information, thereby applying a camera clock of a selected frequency to the camera 121 (S310).

When the number of selected frequencies is two or more, a camera clock of a more preferable frequency may be selected according to a current camera mode (an operation to be performed by the camera 121 such as video calling and image capturing, or a setting of the camera 121 such as pixels and exposure time).

Figure 8:
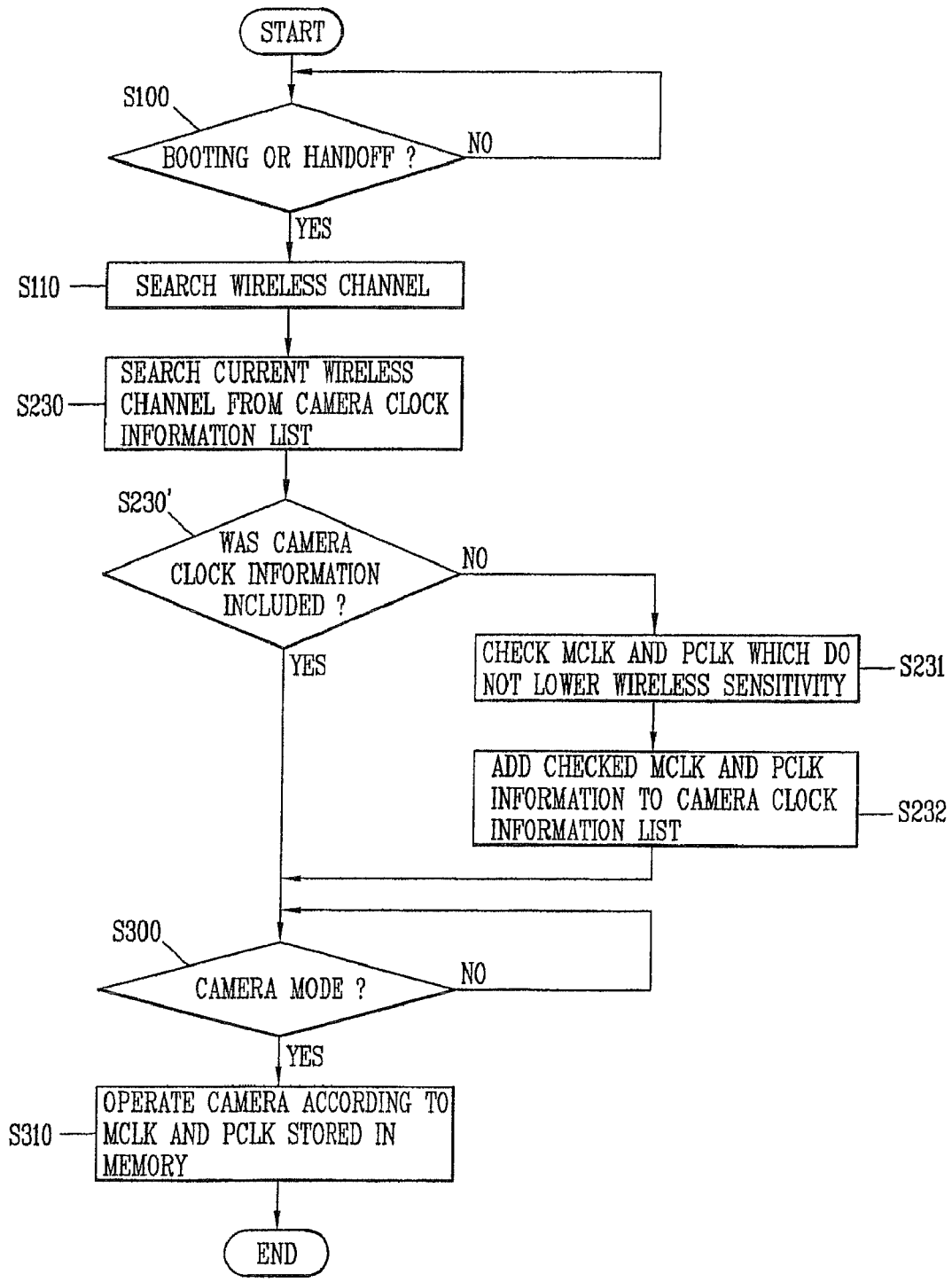
FIG. 8 is a flowchart showing operations included in another embodiment of a method for checking a camera clock frequency.

FIG. 8 shows operating included in another embodiment of a method for selecting a camera clock of a frequency which does not lower wireless sensitivity based on information on wireless channels and camera clocks of frequencies which do not lower wireless sensitivity with respect to the wireless channels. This information may be referred to as a camera clock information list which is subject to being updated.

When a user boots the mobile terminal 100 or when the mobile terminal 100 is moved to other wireless communication section from a specific wireless communication section, the controller 180 searches for a wireless channel to be connected (S110).

Once a new wireless channel has been searched, the controller 180 checks information stored in the memory 160 (a camera clock information list). This information provides an indication of wireless channels and camera clocks of frequencies which do not lower wireless sensitivity with respect to the wireless channels. This information is used to obtain camera clock information with respect to a currently searched wireless channel (S230).

More specifically, the camera clock information may include information on a main clock and/or a pixel qualification clock of a frequency which does not lower wireless sensitivity with respect to a specific wireless channel. The camera clock information list may indicate a list of specific channels and camera clock information corresponding to the specific channels. As aforementioned, the number of camera clocks of frequencies with respect to a specific channel may be two or more. The camera clock information list may be provided from a manufacturing company, a communication company, thus to be stored or may be added or updated as follows.

If information on a searched wireless channel has not been included in the camera clock information list (e.g., in case the searched wireless channel is a new channel), the controller 180 checks a camera clock of a frequency which does not lower wireless sensitivity with respect to the wireless channel searched in the aforementioned manners shown in S210~S215 and S220~S225 (S231).

Once a camera clock frequency which does not lower wireless sensitivity has been checked, information on the wireless channel and the camera clock corresponding to the wireless channel is added to the camera clock information list thus to be stored in the memory 160, thereby updating the camera clock information list (S232). Accordingly, when the same wireless channel is later searched again, the corresponding clock of the frequency may be directly applied to the camera 121 without performing the steps S210~S215 and S220~S225.

Then, the controller 180 controls the PLL 520, oscillators 710, 720 and 730, and camera 121, based on information on a camera clock of a frequency searched from the camera clock information list, and a camera clock of a frequency having been determined as one which does not lower wireless sensitivity with respect to a new channel, thereby applying the camera clock of the frequency to the camera 121 (S310).

The steps of searching the camera clock information list (S230), checking the camera clock (S231), and updating the camera clock information list (S232) may be executed only when a user requests for entering a camera mode.

More specifically, when a command with respect to a specific operation of the camera 121 is input by a user, the controller 180 may search the camera clock information list stored in the memory 160 (S230) and controls a camera clock according to the camera clock information list.

If there is no camera clock information with respect to a corresponding channel, a camera clock of a frequency which does not lower wireless sensitivity is checked (S231). Then, the information on the checked camera clock is added to the camera clock information list, thereby updating the camera information list (S232). The checked or searched camera clock information may be separately stored from the camera clock information list (e.g., may be stored in a register relating to control of a camera clock). Then, the controller 180 applies a corresponding camera clock of a frequency to the camera 121.

The above steps (S210~S215, S220~S225, S230~S232) of checking a camera clock of a frequency which does not lower wireless sensitivity may be applied even when a wireless channel is changed in a camera mode which will be later explained.

Figure 9:
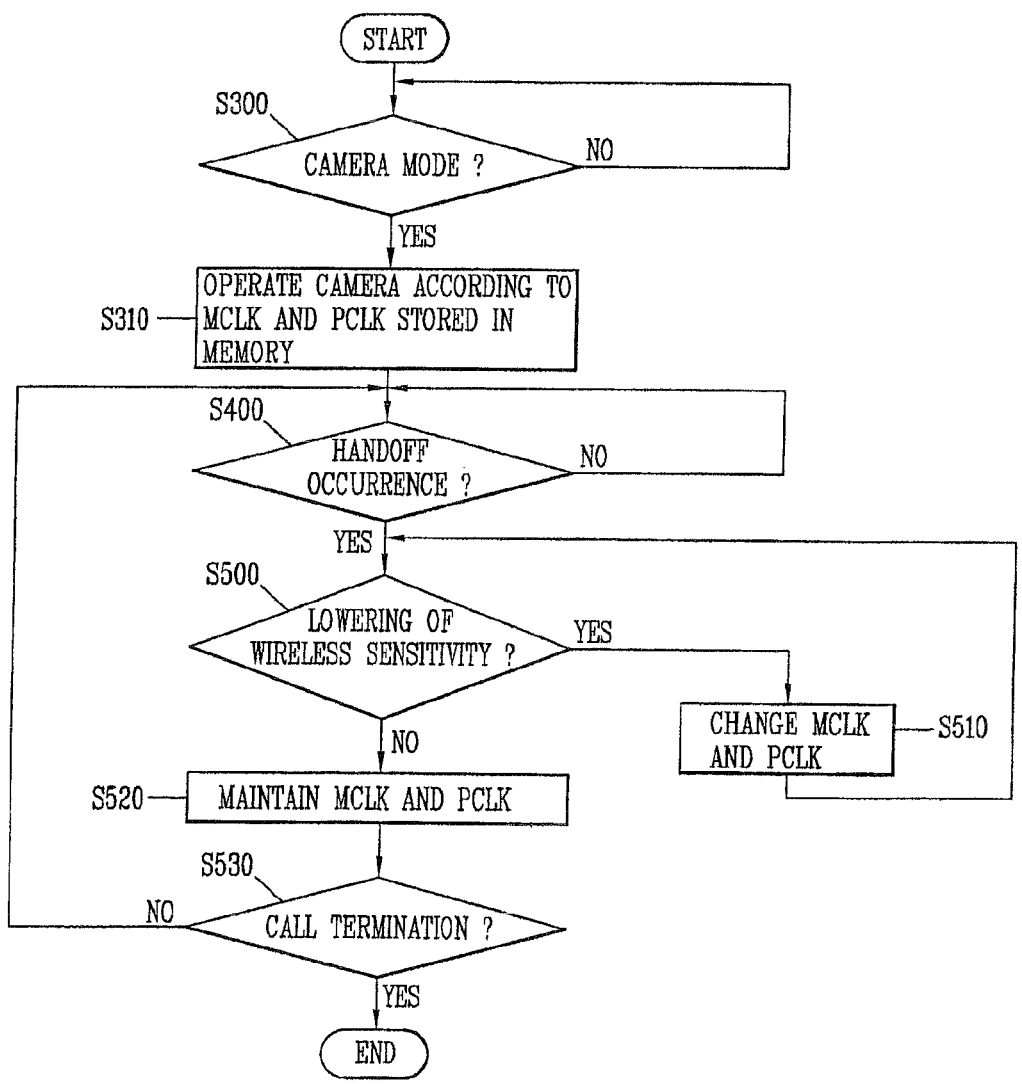
FIG. 9 is a flowchart showing operations included in an embodiment for changing a current camera clock frequency into another camera clock frequency when a wireless channel has been changed in a camera mode.

FIG. 9 shows operations included in another embodiment of a method for controlling a camera clock applied to a camera 121 when a wireless channel is changed in a camera mode. This method may be applied when a current wireless channel is changed during video call in which both a wireless communication function and a camera function are implemented.

If a user requests to enter a camera mode such as video call, the controller 180 operates the camera 121 with a main clock and/or a pixel qualification clock of a predetermined frequency according to camera clock information stored in the memory 160, or camera clock information with respect to a current wireless channel among the camera clock information list as shown in the aforementioned steps (S100~S310) (S310).

If a current wireless channel is changed due to handoff occurring as the mobile terminal moves while the camera 121 is operated with the main clock and/or the pixel qualification clock of the frequency (camera mode), the controller 180 monitors whether the current wireless channel having a frequency is changed to a wireless channel having a different frequency (S400).

If the current wireless channel having a frequency is changed to a wireless channel having a different frequency, the controller 180 checks whether wireless sensitivity has been lowered by a camera clock being driven with respect to the changed wireless channel (S500). As in the above steps (S210~213), whether wireless sensitivity has been lowered or not may be determined by checking wireless sensitivity in a state where a camera clock is being driven, by checking wireless sensitivity in a state where driving of the camera clock is stopped, and then by comparing the two wireless sensitivities with each other.

Alternatively, whether wireless sensitivity has been lowered or not may be determined only when wireless sensitivity with respect to a wireless channel changed while a camera clock is being driven is less than a predetermined threshold value, e.g., a minimum wireless sensitivity value where video calling can be smoothly performed. More specifically, if video calling is smoothly performed even via a changed wireless channel, a camera clock of a frequency being driven can be maintained without checking whether wireless sensitivity has been lowered due to interference by the camera clock.

If lowering of wireless sensitivity has been detected, the current camera clock is changed to a camera clock of a different frequency (S510). Then, the changed camera clock is driven, and whether wireless sensitivity has been lowered is checked again (S500). If it is determined that wireless sensitivity has not been lowered by a camera clock of a previous frequency or a changed frequency, the camera clock of the frequency being driven (the previous frequency or the changed frequency) is maintained (S520).

Figure 10:
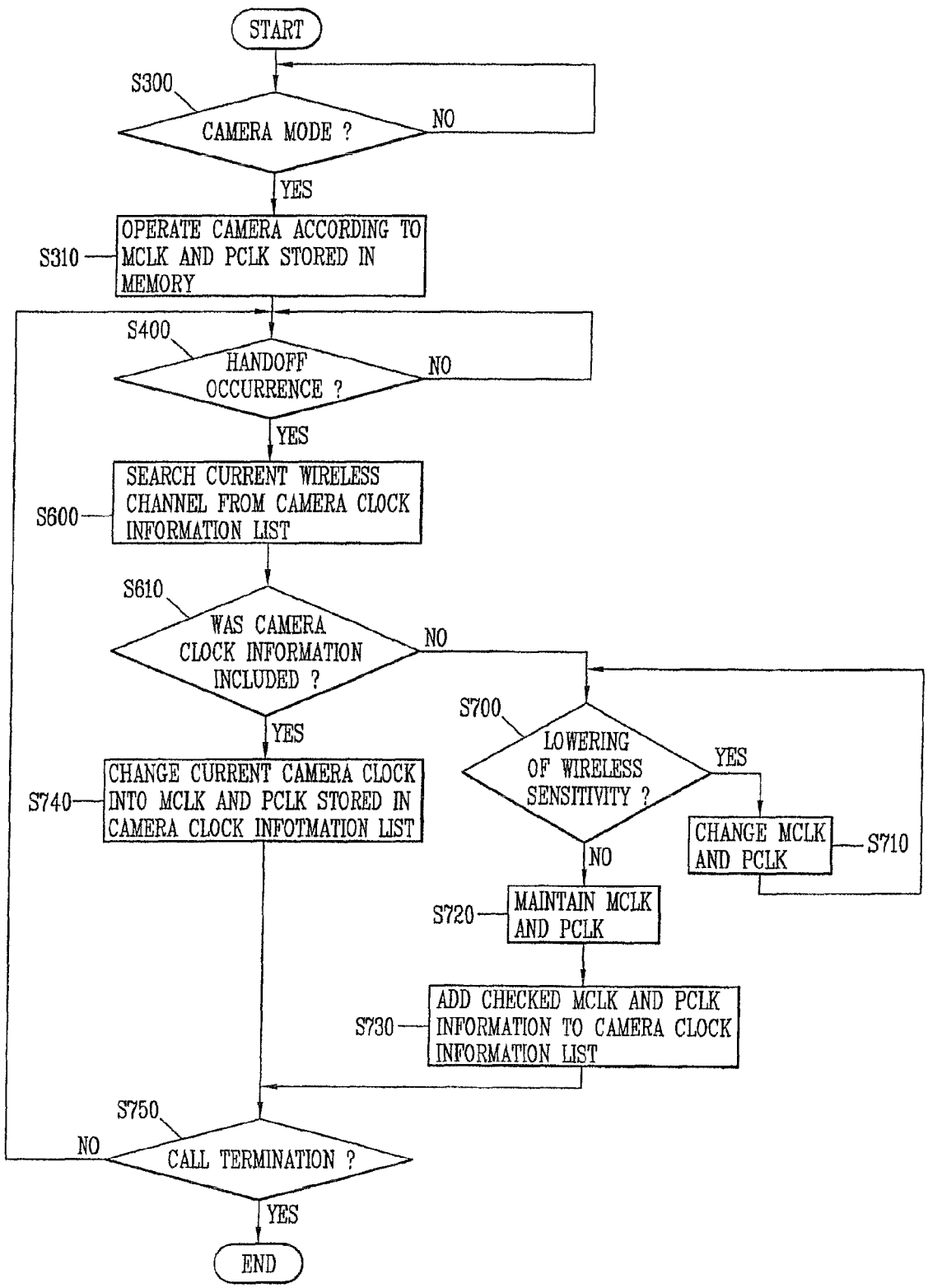
FIG. 10 is a flowchart showing operations included in one embodiment of a method for changing a current camera clock frequency into another camera clock frequency when a wireless channel has been changed in a camera mode.

FIG. 10 shows operations included in another embodiment of a method for controlling a camera clock applied to the camera 121 using a camera clock information list, when a wireless channel is changed in a camera mode.

If a user requests to enter a camera mode such as video call, the controller 180 operates the camera 121 with a main clock and/or a pixel qualification clock of a predetermined frequency according to camera clock information stored in the memory 160, or camera clock information with respect to a current wireless channel among the camera clock information list as shown in the aforementioned steps (S100~S310) (S310).

If a current wireless channel is changed due to handoff occurring as the mobile terminal moves while the camera 121 is operated with the main clock and/or the pixel qualification clock of the frequency (camera mode), the controller 180 monitors whether the current wireless channel having a frequency is changed to a wireless channel having a different frequency (S400).

If a new wireless channel has been searched, the controller 180 checks information (hereinafter, 'camera clock information list') on a wireless channel stored in the memory 160 and a camera clock of a frequency which does not lower wireless sensitivity with respect to the wireless channel, thereby checking camera clock information with respect to a currently searched wireless channel (S600).

If the camera clock information list does not include information on the searched wireless channel, i.e., in case of the searched wireless channel is a new channel, the controller 180 checks a camera clock of a frequency which does not lower wireless sensitivity with respect to the wireless channel searched in the aforementioned steps S500 and S510 (S700~S710).

Once a camera clock of a frequency which does not lower wireless sensitivity has been checked, information on wireless channels and camera clocks corresponding to the wireless channels is added to the camera clock information list thus to be stored in the memory 160, thereby updating the camera clock information list (S730). Accordingly, when the wireless channel is later searched again, the wireless channel can be directly applied to the camera without performing the steps S700~S740.

Then, the controller 180 controls the PLL 520, oscillators 710, 720 and 730, and camera 121 so that the camera clock of the frequency can be applied to the camera 121. Here, the camera clock of the frequency has been searched from the camera clock information list (S740), or has been determined as one which does not lower wireless sensitivity with respect to a new channel (S720).

One or more embodiments of the aforementioned methods may be applied not only to a wireless communication channel used in the mobile communication module 112, but also to a wireless communication channel used in the broadcast receiving module 111, wireless internet module 113, short-range communication module 114, or position information module 115. Each component having wireless sensitivity which may be influenced by interference due to a specific frequency of the camera 121.

Further, the aforementioned method embodiments may be implemented as program code stored in a computer-readable storage medium. The storage medium may include ROM, RAM, CD-ROM, a magnetic tape, a floppy disc, an optical data storage device, etc. And, the storage medium may be implemented as carrier wave (transmission through the Internet). The computer may include the controller 180 of the mobile terminal.

Moreover, an object of one or more of the aforementioned embodiments is to provide a mobile terminal capable of actively varying a frequency of a camera clock applied to the mobile terminal according to a wireless channel via which the mobile terminal performs a communication, and a control method thereof.

Another object is to provide a mobile terminal capable of checking a camera clock to be applied to a camera before entering a camera mode according to change of a wireless channel, and a control method thereof.

Another object is to provide a mobile terminal capable of preventing interference by using camera clock information with respect to a specific wireless channel, and a control method thereof.

In accordance with one embodiment, a mobile terminal comprises a memory; a camera; and a controller for controlling a frequency of a camera clock relating to an operation of the camera, wherein if a new wireless channel is searched due to booting of the mobile terminal or the occurrence of handoff, the controller checks a camera clock of a frequency which does not lower wireless sensitivity with respect to the searched wireless channel among clocks of different frequencies applicable to the camera, thus to store the checked camera clock in the memory, and the controller operates the camera by applying the checked camera clock of the frequency when the mobile terminal has entered a camera mode.

In accordance with another embodiment, a method for controlling a mobile terminal comprises searching a wireless channel when the mobile terminal is booted or when handoff occurs due to movement of the mobile terminal; checking a camera clock of a frequency which does not lower wireless sensitivity with respect to the searched wireless channel among clocks of different frequencies applicable to a camera;

and operating the camera by applying the checked camera clock of the frequency when the mobile terminal has entered a camera mode.

In accordance with another embodiment, a method for controlling a mobile terminal comprises operating at least one clock at first and second frequencies; determining wireless sensitivities of the mobile terminal at the first and second frequencies; comparing the wireless sensitivities; and controlling a camera of the mobile terminal at one of the first or second frequencies based on said comparison of the wireless sensitivities.

The wireless sensitivities are determined and the camera is controlled based on said comparison when the mobile terminal is booted at power on. Alternatively, the wireless sensitivities are determined and the camera is controlled based on said comparison when a wireless channel of the mobile terminal changes. The wireless channel may change as a result of a handoff operation.

The mobile terminal may communicate signals over a wireless channel based on a clock different from the clock operated at the first and second frequencies.

In addition, the operating step may include operating a first clock at the first frequency; and operating a second clock at the second frequency, wherein controlling the camera includes selecting one of the first clock or second clock to drive the camera based on said comparison of the wireless sensitivities.

In addition, the controlling step may include controlling the camera of the mobile terminal based on one of the first frequency or second frequency that generates a comparatively lower reduction in wireless sensitivity for a wireless channel on which the mobile terminal is operating.

The camera of the mobile terminal may be controlled at said one of the first or second frequencies in response to the mobile terminal entering a camera mode. Alternatively, the camera of the mobile terminal may be controlled at said one of the first or second frequencies in response to the mobile terminal entering a video calling mode.

In addition, the mobile terminal may include a main clock to drive the camera, and a pixel qualification clock output from the camera, wherein the main clock is driven at one of the first or second frequencies based on said comparison of the wireless sensitivities. The main clock may operate based on a frequency variable output from a phase-locked loop circuit, and/or the main clock operates based on an output from one of a plurality of clock generators which respective generate the first and second frequencies. A frequency of the pixel qualification clock may correspond to a multiplied or divided frequency of the main clock, the main clock frequency being multiplied or divided based on a predetermined ratio.

In accordance with another embodiment, a method for controlling a terminal comprises determining wireless sensitivity of the terminal at a first time; determining wireless sensitivity of the terminal at a second time; comparing the wireless sensitivities at the first and second times; and determining a clock frequency for driving a camera of the mobile terminal based on the comparison, wherein the first time corresponds to when the camera is not driven and the second time corresponds to when the camera is driven.

The determining step may includes changing the clock frequency for driving the camera from a first frequency to a second frequency when the wireless sensitivity at the second time is lower than the wireless sensitivity at the first time. Alternatively, the determining may include maintaining the clock frequency at a frequency selected before the second time when a difference between a wireless sensitivity at the first time and the wireless sensitivity at the second time falls within a predetermined range.

In accordance with another embodiment, a method for controlling a mobile terminal comprises operating the mobile terminal on a first wireless channel; searching stored information listing a plurality of wireless channels and corresponding camera clock frequencies; identifying a camera clock frequency corresponding to the first wireless channel; and driving a camera of the mobile terminal at the camera clock frequency that corresponds to the first wireless channel, wherein each camera clock frequency included in the stored information causes a predetermined range of wireless sensitivity to be generated when the mobile terminal is operated at respective one of the wireless channels.

If the first wireless channel is not found in the stored information during said search, said method further comprises operating at least one clock at first and second frequencies; determining wireless sensitivities of the mobile terminal at the first and second frequencies; comparing the wireless sensitivities; and controlling a camera of the mobile terminal at one of the first or second frequencies based on said comparison of the wireless sensitivities. The method may also include updating the stored information to list the first or second frequency as corresponding to the first wireless channel.

In accordance with another embodiment, a mobile terminal includes at least one camera; and a controller to control an operating frequency of the camera by operating at least one clock at first and second frequencies; determining wireless sensitivities of the mobile terminal at the first and second frequencies; comparing the wireless sensitivities; and controlling a camera of the mobile terminal at one of the first or second frequencies based on said comparison of the wireless sensitivities.

In accordance with another embodiment, a mobile terminal includes at least one camera; and a controller to control an operating frequency of the camera by determining wireless sensitivity of the terminal at a first time; determining wireless sensitivity of the terminal at a second time; comparing the wireless sensitivities at the first and second times; and determining a clock frequency for driving a camera of the mobile terminal based on the comparison, wherein the first time corresponds to when the camera is not driven and the second time corresponds to when the camera is driven.

In accordance with another embodiment, a mobile terminal may include at least one camera; and a controller to control an operating frequency of the camera by operating the mobile terminal on a first wireless channel; searching stored information listing a plurality of wireless channels and corresponding camera clock frequencies; identifying a camera clock frequency corresponding to the first wireless channel; and driving a camera of the mobile terminal at the camera clock frequency that corresponds to the first wireless channel, wherein each camera clock frequency included in the stored information causes a predetermined range of wireless sensitivity to be generated when the mobile terminal is operated at respective one of the wireless channels.

Herein, the term mobile terminal may be understood to cover any of the following: mobile phones, smart phones, laptop computers, digital broadcasting terminals, personal digital assistants (PDAs), portable multimedia players (PMPs), and navigators. Moreover, one or more embodiments previously described may also be applied to any one of a number of stationary terminals such as digital TVs, desktop computers and the like, excluding a case of being applicable only to the mobile terminals.

The suffixes attached to components of the mobile terminal, such as 'module' and 'unit or portion' were used for facilitation of the detailed description of the present embodiments. Therefore, the suffixes do not have different meanings from each other.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Also, the features of any one embodiment may be combined with the features of one or more remaining embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a mobile terminal that includes at least one camera, comprising:
   operating at least one clock at first and second frequencies;
   determining wireless signal reception sensitivities of the mobile terminal at the first and second frequencies;
   comparing the wireless signal reception sensitivities;
   determining that one of the first or second frequencies does not lower wireless signal reception sensitivity for a searched wireless channel; and
   operating the camera at the first frequency or the second frequency determined not to lower wireless signal reception sensitivity for the searched wireless channel, wherein:
   the at least one clock is operated at the first and second frequencies before the mobile terminal enters a camera mode,
   the camera is operated at the first frequency or the second frequency determined not to lower wireless signal reception sensitivity for the searched wireless channel when the mobile terminal is in camera mode, and
   when a difference between the wireless signal reception sensitivities at the first and second frequencies is less than a predetermined value, the method includes:
   operating the camera at a third frequency which produces a wireless signal reception sensitivity lower than the wireless signal reception sensitivities produced at each of the first and second frequencies, wherein the third frequency is determined based on at least one of a a mode of the camera or a setting of the camera.

2. The method of claim 1, wherein the wireless channel changes as a result of a handoff operation.

3. The method of claim 1, wherein the mobile terminal communicates signals over a wireless channel based on a clock different from the clock operated at the first and second frequencies.

4. The method of claim 1, wherein operating the at least one clock at the first and second frequencies includes:
   operating a first clock at the first frequency; and
   operating a second clock at the second frequency.

5. The method of claim 1, wherein the camera of the mobile terminal is controlled at said one of the first or second frequencies in response to the mobile terminal entering a video calling mode.

6. The method of claim 1, wherein the mobile terminal includes:
   a main clock to drive the camera, and
   a pixel qualification clock output from the camera,
   wherein the main clock is driven at one of the first or second frequencies based on said comparison of the wireless signal reception sensitivities.

7. The method of claim 6, wherein the main clock operates based on a frequency variable output from a phase-locked loop circuit.

8. The method of claim 6, wherein the main clock operates based on an output from one of a plurality of clock generators which respective generate the first and second frequencies.

9. The method of claim 6, wherein a frequency of the pixel qualification clock corresponds to a multiplied or divided frequency of the main clock, the main clock frequency being multiplied or divided based on a predetermined ratio.

10. A method for controlling a mobile terminal, comprising:
    operating the mobile terminal on a first wireless channel;
    searching stored info nation indicative of a plurality of wireless channels and corresponding camera clock frequencies;
    identifying a camera clock frequency corresponding to the first wireless channel based on a result of the search; and
    driving a camera of the mobile terminal at the camera clock frequency that corresponds to the first wireless channel, wherein:
    each of the camera clock frequencies included in the stored information causes a predetermined range of wireless signal reception sensitivity to be generated when the mobile terminal is operated at respective one of the wireless channels, and
    the camera is operated at another frequency which produces a wireless signal reception sensitivity lower than the wireless signal reception sensitivities produced at each of the stored camera clock frequencies, wherein the other frequency is determined based on at least one of a mode of the camera or a setting of the camera.

11. The method of claim 10, wherein, when the first wireless channel is not found in the stored information during said search, said method further comprises:
    operating at least one clock at first and second frequencies;
    determining wireless signal reception sensitivities of the mobile terminal at the first and second frequencies;
    comparing the wireless signal reception sensitivities; and
    controlling a camera of the mobile terminal at one of the first or second frequencies based on said comparison of the wireless signal reception sensitivities.

12. The method of claim 11, further comprising:
    updating the stored information to list the first or second frequency as corresponding to the first wireless channel.

13. A mobile terminal comprising:
    at least one camera; and
    a controller to control an operating frequency of the camera by:
    (a) operating at least one clock at first and second frequencies;

(b) determining wireless signal reception sensitivities of the mobile terminal at the first and second frequencies;
(c) comparing the wireless signal reception sensitivities;
(d) determining that one of the first or second frequencies does not lower wireless signal reception sensitivity for a searched wireless channel; and
(e) operating the camera at the first frequency or the second frequency determined not to lower wireless signal reception sensitivity for the searched wireless channel,
wherein the at least one clock is operated at the first and second frequencies before the mobile terminal enters a camera mode,
wherein the camera is operated at the first frequency or the second frequency determined not to lower wireless signal reception sensitivity for the searched wireless channel when the mobile terminal is in camera mode,
wherein, when a difference between the wireless signal reception sensitivities at the first and second frequencies is less than a predetermined value, and
wherein the controller further operates the camera at a third frequency which produces a wireless signal reception sensitivity lower than the wireless signal reception sensitivities produced at each of the first and second frequencies when a difference between the wireless signal reception sensitivities at the stored camera clock frequencies lies within a predetermined range, the third frequency being determined based on at least one of a mode of the camera or a setting of the camera.

14. A mobile terminal comprising:
at least one camera; and
a controller to control an operating frequency of the camera by:
(a) operating the mobile terminal on a first wireless channel;
(b) searching stored information listing a plurality of wireless channels and corresponding camera clock frequencies;
(c) identifying a camera clock frequency corresponding to the first wireless channel; and
(d) driving a camera of the mobile terminal at the camera clock frequency that corresponds to the first wireless channel, wherein each camera clock frequency included in the stored information causes a predetermined range of wireless signal reception sensitivity to be generated when the mobile terminal is operated at respective one of the wireless channels,
wherein the controller operates the at another frequency which produces a wireless signal reception sensitivity lower than the wireless signal reception sensitivities produced at each of the stored camera clock frequencies when a difference between the wireless signal reception sensitivities at the stored camera clock frequencies lies within a predetermined range, and wherein the other frequency is determined based on at least one of a mode of the camera or a setting of the camera.

\* \* \* \* \*